(12) United States Patent
Li (10) Patent No.: US 11,194,399 B2
(45) Date of Patent: Dec. 7, 2021

(54) SYSTEMS AND METHODS FOR IMPLEMENTING HAILING REQUEST

(71) Applicant: Chian Chiu Li, Fremont, CA (US)

(72) Inventor: Chian Chiu Li, Fremont, CA (US)

( * ) Notice: Subject to any disclaimer, the term of this patent is extended or adjusted under 35 U.S.C. 154(b) by 374 days.

(21) Appl. No.: 16/024,840

(22) Filed: Jun. 30, 2018

(65) Prior Publication Data

US 2020/0004341 A1 Jan. 2, 2020

(51) Int. Cl.
*G06F 3/01* (2006.01)
*G05D 1/02* (2020.01)
*B60Q 1/50* (2006.01)
*G06F 16/9535* (2019.01)

(52) U.S. Cl.
CPC .............. *G06F 3/017* (2013.01); *B60Q 1/50* (2013.01); *G05D 1/0212* (2013.01); *G05D 2201/0213* (2013.01); *G06F 16/9535* (2019.01)

(58) Field of Classification Search
CPC ........................................................ G06F 3/017
See application file for complete search history.

(56) References Cited

U.S. PATENT DOCUMENTS

| 8,005,488 | B2* | 8/2011 | Staffaroni | G06Q 10/06311 |
| | | | | 455/456.2 |
| 10,150,448 | B2* | 12/2018 | Huennekens | G08B 21/22 |
| 10,303,173 | B2* | 5/2019 | Rander | G01C 21/3453 |
| 10,717,412 | B2* | 7/2020 | Abel Rayan | H04W 12/00508 |
| 10,820,174 | B1* | 10/2020 | Salter | B60Q 9/00 |
| 10,847,159 | B1* | 11/2020 | Li | G10L 15/26 |
| 2018/0196417 | A1* | 7/2018 | Iagnemma | G05D 1/0027 |
| 2019/0212738 | A1* | 7/2019 | Umetani | B60Q 1/503 |
| 2019/0263422 | A1* | 8/2019 | Enthaler | G06K 9/00375 |
| 2019/0265703 | A1* | 8/2019 | Hicok | G06Q 50/30 |
| 2019/0361447 | A1* | 11/2019 | Rander | B60W 30/00 |
| 2021/0182019 | A1* | 6/2021 | Li | G06F 3/017 |

* cited by examiner

*Primary Examiner* — Michael A Berns (57) ABSTRACT

Systems and methods for assisting a user to hail a vehicle using a gesture or application. In one aspect, when a vehicle detects a user hails it with a gesture, it calculates a route and moves to the user autonomously. In another aspect, after a vehicle receives a message from a remote facility, it starts searching for a user nearby and moves to the user autonomously when the user hails it via a gesture or application.

20 Claims, 9 Drawing Sheets

SYSTEMS AND METHODS FOR IMPLEMENTING HAILING REQUEST

FEDERALLY SPONSORED RESEARCH

Not applicable

SEQUENCE LISTING OR PROGRAM

Not applicable

BACKGROUND

Field of Invention

This invention relates to hailing a vehicle, more particularly to hailing an autonomous vehicle.

Description of Prior Art

Autonomous vehicle (also known as driverless or self-driving vehicle) is a vehicle capable of sensing and navigating around the vehicle's surroundings and travelling autonomously to a destination without user input. It represents a great advance in the transportation industry.

When autonomous vehicles become widely available, many users may rely on self-driving taxis or self-driving cargo vehicles to go to places or ship goods. Usually a user places an order online and then waits for a service to dispatch a vehicle. Sometimes, there are vehicles parked beside the curb, sitting at a parking lot, or running on a road. When a user sees a vehicle with a vacant sign, the user may want to hail it directly on site, instead of contacting a remote facility and going through an online ordering or reservation process.

Therefore, there exists a need for a user to hail an autonomous vehicle directly when the vehicle is in sight.

As used herein, word "vehicle" may mean any form of motorized transportation or a device capable of moving around autonomously. Examples of vehicle may include automobile, drone, flying car, aircraft, ship, robot, and the like. For convenience of description, "Service Center" as used herein may mean a center or remote facility as a business entity or a server which is operated at Service Center. "Check in" as used herein may mean a user logs in a system at a vehicle using info obtained from a reservation or using other suitable info. In one scenario, after a check-in process, the identity of a user may be confirmed. In another scenario, after a check-in process, the identity of a user may remain unknown. "Hailing (hail) a vehicle" and "Hail a car" as used herein may mean a physical act, a verbal act, or an online process which is performed by a user for ordering a vehicle for renting purpose or reserving a vehicle for present or future use.

Objects and Advantages

Accordingly, several main objects and advantages of the present invention are:

a). to provide improved systems and methods for hailing a vehicle;
b). to provide such systems and methods for a user to hail a vehicle directly when the vehicle is in sight;
c). to provide such systems and methods which enable a user to hail a vehicle with gestures;
d). to provide such systems and methods which enable a user to find vehicles nearby; and
e). to provide such systems and methods which enable a vehicle to recognize a user's gesture and drive to the user autonomously.

Further objects and advantages will become apparent from a consideration of the drawings and ensuing description.

SUMMARY

In accordance with the present invention, vehicle hailing systems and methods are provided. When a user sees an autonomous vehicle, the user may hail it directly using a gesture. On the other hand, when an autonomous vehicle detects that a user is gesturing at it, the vehicle may calculate a route and navigate to the user. In addition, a user may find vehicles nearby via an app and select a vehicle with gestures. Using gestures to hail a vehicle is natural, intuitive, and convenient when the vehicle is visible in a short distance.

DRAWING FIGURES

FIG. 1-A is an exemplary diagram describing an embodiment involving a vehicle, a client system, and a server in accordance with the present invention.

FIG. 1-B is an exemplary diagram which depicts a client system in accordance with the present invention.

FIG. 1-C is an exemplary diagram which depicts a user and a vehicle in accordance with the present invention.

FIGS. 2-A and 2-B are exemplary diagrams which illustrate a hailing scenario in accordance with the present invention.

REFERENCE NUMERALS IN DRAWINGS

| | | | |
|---|---|---|---|
| 10 | Processor | 12 | Computer Readable Medium |
| 14 | Communication Network | 16 | Client System |
| 18 | Vehicle | 20 | Processing Module |
| 22 | Database | 24 | Server |
| 26 | Control System | 28 | User |
| 30 | Vehicle | 32 | Vehicle |
| 34 | Vehicle | 36 | User |
| 38 | Smartphone | 40 | Button |
| 42 | Button | 44 | Button |
| 46 | Screen | 48 | Window |
| 50 | Button | 52 | Window |
| 54 | Button | 56 | Route |
| 58 | Button | 60 | Window |
| 62 | Window | 64 | Button |
| 66 | Button | | |

100-172 are exemplary steps.

DETAILED DESCRIPTION

The following exemplary embodiments are provided for complete disclosure of the present invention and to fully inform the scope of the present invention to those skilled in the art, and the present invention is not limited to the schematic embodiments disclosed, but can be implemented in various types.

Figure 1:
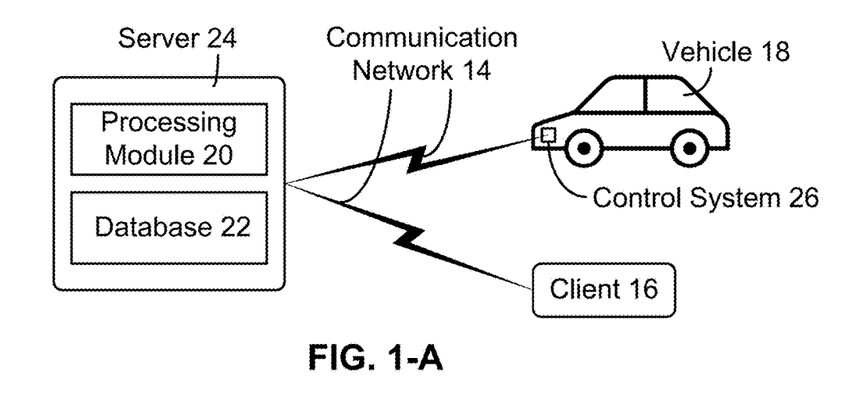

FIG. 1-A is an exemplary block diagram of one embodiment according to the present invention. A vehicle 18 and server 24 are connected via a wireless communication network 14. So are a client system 16 and server 24. Vehicle 18 is controlled by a control system 26. Server 24 is installed and operated at Service Center. Service Center represents a ride-hailing business. It administers vehicles including vehicle 18 and processes hailing requests from users. The word "server" as used herein means a system or systems which may have similar functions and capacities as one or more servers. Server 24 may exemplarily be divided into two blocks, represented by a processing module 20 and database 22. Processing module 20 may include processing and communication functions. Database 22 may store vehicle service records and information, map data and geographic info of certain areas, user account information, user transaction records, etc. The database may include a cluster of memory chips and/or storage modules. In the figure, servers 24 may represent a device that collects, processes, stores, and maintains information and documents, sends instructions to vehicles, transmits messages to users, executes tasks requested by users, etc.

FIG. 1-B describes client system 16 exemplarily. Client system 16 may cover a range of electronic devices and gadgets, e.g., a smartphone, a tablet computer, a smart watch, a virtual reality (VR) device, an augmented reality (AR) device, and the like. Client system 16 may include a processor 10 and computer readable medium 12. Processor 10 may mean one or more processor chips or systems. Medium 12 may be the main part of a storage system and may include a memory hierarchy built by one or more memory chips or storage components like RAM, ROM, FLASH, or other suitable storage modules. Processor 10 may run programs or sets of executable instructions stored in medium 12 for performing various functions and tasks like surfing on the Internet, placing purchase orders, hailing a vehicle, sending and receiving emails and short messages, playing video or music, etc. Client system 16 may also include input, output, and communication components, which may be individual modules or integrated with processor 10.

In addition, client system 16 may have a display (not shown in the figure for brevity reason) and a graphical user interface (GUI). The display may have a liquid crystal display (LCD) screen or light emitting diode (LED) screen and may be arranged sensitive to touches, i.e., sensitive to haptic and/or tactile contact with a user. A user may use the interface to interact with client system 16, Service Center or server 24, an e-commerce website, other online users, and so on. Via the interface, for instance, a user may hail a vehicle, place online orders, play a game, communicate with other devices, obtain all sorts of information, and so on.

Furthermore, client system 16 may have a voice recognition device to receive a user's verbal command or voice input. The system may also have facial recognition capability to recognize a user. In addition, the system may have a gesture detection mechanism to receive a user's gesture instructions. For VR and AR devices and some wearable devices, a virtual screen or a screen with a very small size may be arranged. A virtual screen may be part of a displaying system that doesn't have a physical screen. Since it is impractical or inconvenient to touch a virtual screen or very small screen, a user may use voice and gestures to interact with a system and issue commands.

FIG. 1-C shows that a user 28, who is making a hailing gesture, is detected by vehicle 18 schematically. Vehicle 18 may be a device which moves around autonomously. Examples of vehicle 18 include automobile, robot, drone, flying car, ship, or the like. For simplicity reasons, an autonomous automobile is used as vehicle 18 to explain principles. The vehicle may have various sensors (not shown in the figure) to ascertain the external environment and internal situation. The sensors may include cameras, a radar system, a light detection and ranging (LIDAR) system, a global position system (GPS), a speed sensor, an accelerometer, an electronic compass, etc. Control system 26 of vehicle 18, like client system 16, may have a computer processor, a storage device, a display with a touch sensitive screen, a voice recognition system, a facial recognition system, and a gesture detection system. It is noted that voice, facial, and gesture recognition technologies are all mature nowadays. The control system may use the sensors to monitor the environment, detect a user, interact with a user, and receive instructions from a user. Moreover, the control system may calculate a route after receiving a user's hailing request and navigate vehicle 18 to the user along the route. In FIG. 1-C. control system 26 finds and ascertains user 28 via sensors like cameras, radar, and LIDAR. It analyzes the user's gestures and determines that the user is waving at vehicle 18.

Figure 2:
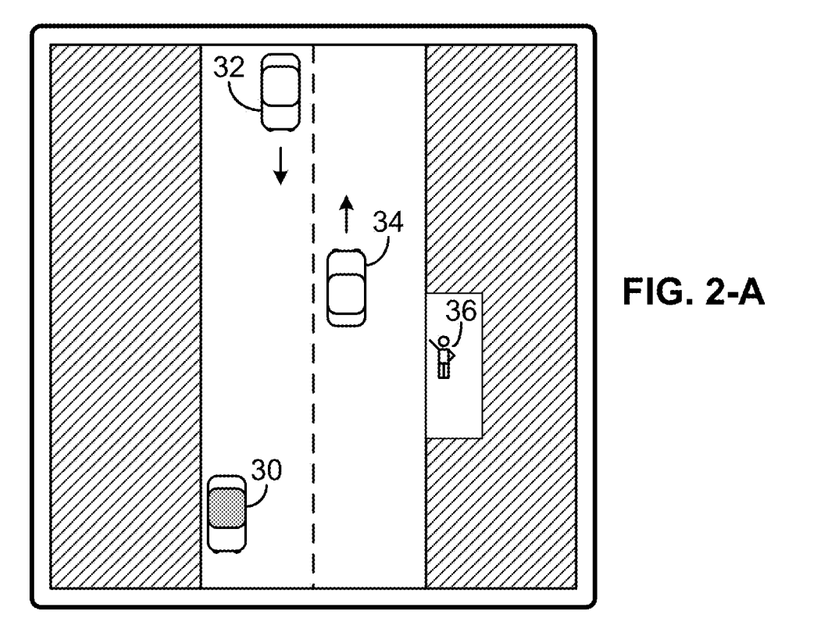

When a user needs a vehicle and sees one on a street, it is natural and convenient to hail the vehicle with a gesture directly. FIGS. 2-A and 2-B use exemplary diagrams to illustrate a hailing process. In FIG. 2-A, there are three vehicles 30, 32, and 34. Vehicles 32 and 34 have no signs and are running toward opposite directions, while vehicle 30 is parked beside the curb with a vacant sign which indicates it is vacant and available for hailing. A user 36 finds vehicle 30 and starts waving at it. In FIG. 2-B, a control system of vehicle 30 detects that user 36 is waving. It analyzes the user's gestures via certain algorithm and concludes that the user is hailing it. Then the control system sends a hailing message to Service Center and asks for approval. Once getting an approval message, the control system calculates a route 56 and drives vehicle 30 to user 36 along the route. Alternatively, the control system may also navigate vehicle 30 to approach user 36 without getting approval from Service Centre. It is noted that the method applies to a vehicle running on a road as well.

Figure 3:
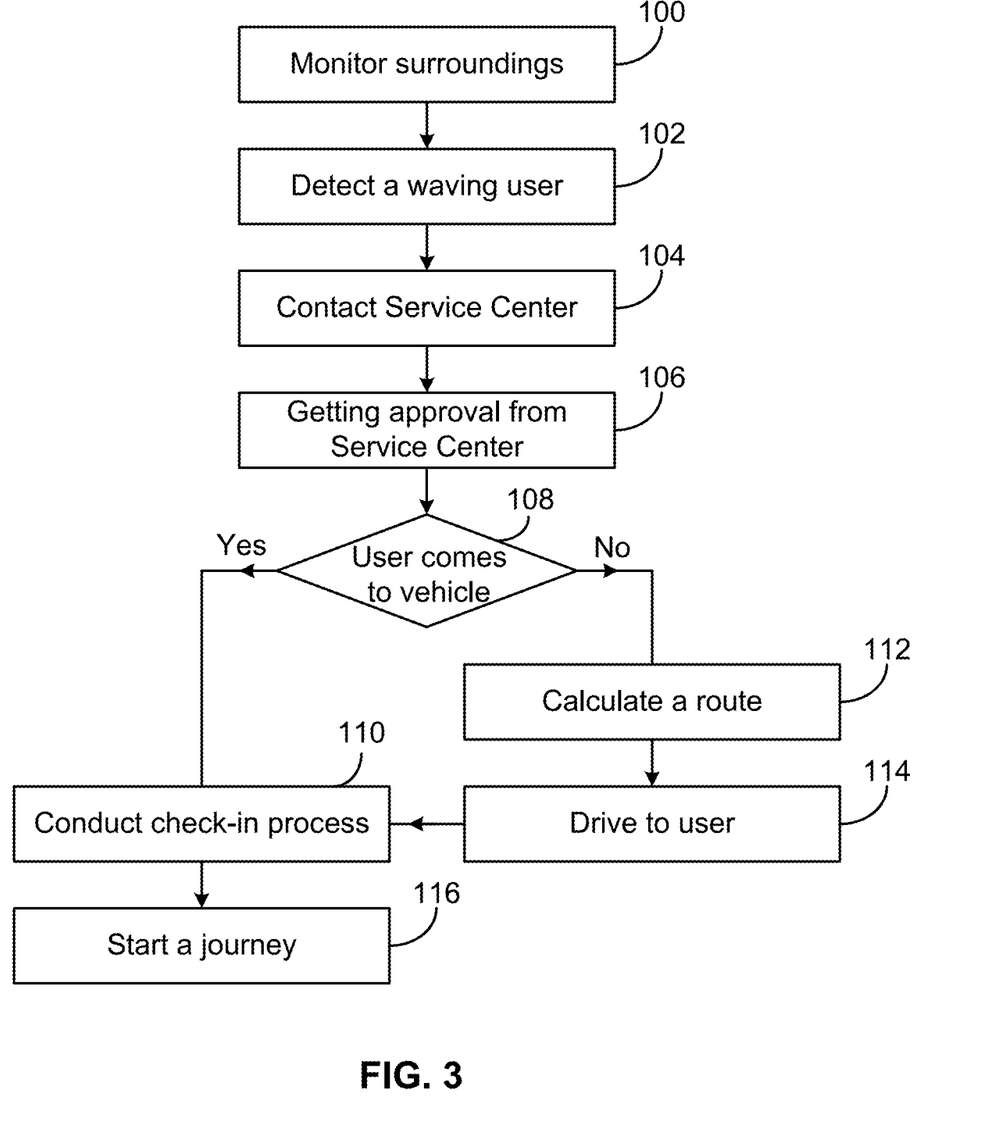
FIG. 3 is an exemplary flow diagram depicting a hailing process in accordance with the present invention.

FIG. 3 shows an exemplary flow diagram which illustrates a hailing process. A vehicle is in standby mode and displays a vacant sign. The vacant sign may have a word like "Vacant" and is arranged to show the vehicle is available for hailing. A control system of the vehicle monitors its surroundings using cameras and other sensors at step 100. The system finds that a user is waving at the vehicle at step 102. To determine whether a user waves at a vehicle, there are two conditions. First, the user waves his or her hand with the palm facing the vehicle. Second, the user is facing the vehicle. If it is detected that a user waves and the two conditions are satisfied at the same time, it is considered that the user waves at the vehicle. If it is detected that a user waves but the two conditions are not satisfied simultaneously, the waving act is ignored. After determining the user is waving at the vehicle, the control system contacts Service Center and sends a hailing message at step 104. Service Center reviews the hailing message and checks whether the vehicle is assigned to a job already. The center also checks whether there is another vehicle which sends a similar hailing message regarding the same user in a given time period. If the vehicle is not reserved for any assignment and the vehicle is the only one which sends a hailing message within the time period, Service Center sends an approval message to the control system.

After getting approval from Service Center at step 106, the control system continues monitoring the user at step 108. The user may walk to the vehicle or stay put at the same place. If it is detected that the user walks toward the vehicle, the vehicle doesn't need to move and hence it waits for the user at the same spot. The control system may replace the vacant sign by another sign with a word like "Welcome", when the user walks to the vehicle. The user may start a check-in process after getting in the vehicle at step 110. If the user doesn't move toward the vehicle, the control system may drive the vehicle to the user after a predetermined time period elapses. The control system may measure the position of the user and calculate a route to go there at step 112. Next at step 114, the control system starts a motor or engine and navigates the vehicle to approach the user, while replacing the vacant sign by a sign with a word like "Coming". After the vehicle stops in front of the user, the user gets in the vehicle and proceeds with check-in procedures at step 110. At step 116, the control system calculates a route to a destination place and begins a journey. After the user gets in, the vehicle may display a sign with a word like "Occupied" so that other users know it is not available for hailing.

Sometimes, e.g., during the rush hour, more than one user may wave at a vehicle at the same time. Thus certain rules may be made for cases when multiple users waves simultaneously. For instance, if a user and a vehicle are on the same side of a road while the other user is on the other side, the user on the same side prevails. When multiple users are on the same side of a road, the user who is closer or the closest to the vehicle prevails. For such a purpose, a vehicle may be arranged to monitor and analyze multiple users at the same time.

When more than one vehicle responds to a waving user, the user may use a finger or a hand to point at a vehicle to select it. When a vehicle detects that a user points or waves at another vehicle or object, it will not proceed to pick up the user.

It is noted that systems and methods for hailing a vehicle not only apply to automobiles, but also apply to robots, drones, flying cars, and ships, as they may have equivalent sensors to ascertain a user and may maneuver to the user autonomously.

Figure 4:
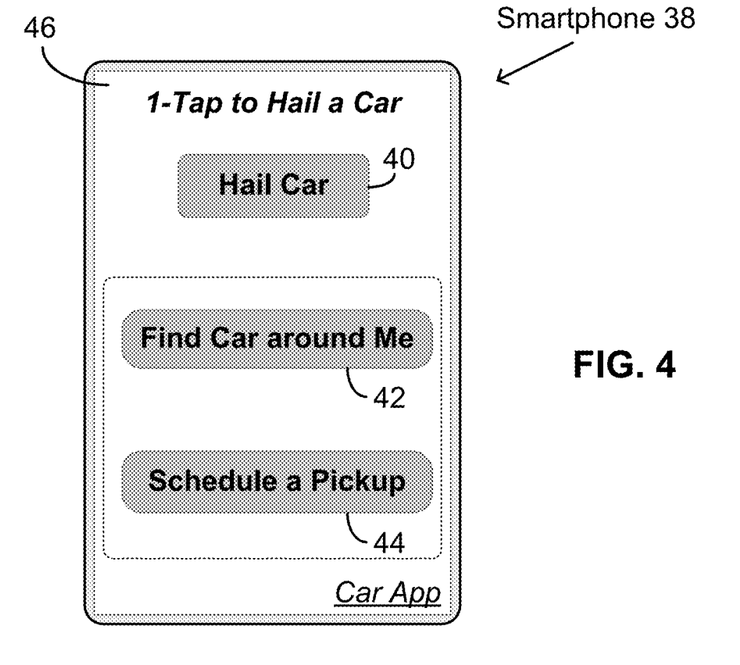
FIGS. 4 and 5 are exemplary diagrams which illustrate interface settings for hailing a vehicle in accordance with the present invention.

A user may gesture at a vehicle when the vehicle is in sight and monitoring the user. But a hailing gesture doesn't work if a vehicle is in sleeping mode with sensors turned off. When a vehicle is in sleeping mode, a user may use an app to contact Service Center and let the center send a message to activate the vehicle. FIG. 4 shows an exemplary diagram of an app interface which a user may use to hail a car or find a car. Assume that Car App is installed at a smartphone 38. The app may be provided by Service Center for hailing or reserving a vehicle. As in the figure, the app is launched and content in the app interface is shown on a touch-sensitive screen 46. There are three interactive elements or buttons 40, 42, and 44 representing three options presented to a user. The buttons have exemplary labels like "Hail Car", "Find Car around Me", and "Schedule a Pickup" respectively. The top portion of the interface is configured for a simple and quick hailing process which requires one action only. The first line shows a title, like a sentence "1-Tap to Hail a Car". Below the title, button 40 is arranged for starting a one-tap-to-hail-a-car process.

The app is designed such that a user may just tap button 40 to complete a vehicle hailing process without submitting a pickup location, pickup time, destination location, or other information. Assume that a user has an account at Service Center and enables a location option at phone 38. When the location option is enabled, phone 38 may turn on GPS or use another positioning mechanism to get its location info. After Car App is launched, an interface like the one in FIG. 4 appears. Since the phone's location is measured constantly, the app may obtain data of the current location anytime. Once a user taps button 40, it prompts the app to send a message to Service Center. The message may contain at least three items: The user's account number, data of the current location, and a request for a vehicle. Service Center may assume that the user needs a vehicle right now and a pickup place may be the user's current location or a nearby place if the current location is not suitable for pickup. Next Service Center may select and dispatch a vehicle to pick up the user and send a confirmation message to the user in the meantime. The message may show up in the app interface with content like when a vehicle will come and where a pickup place will be. If the user closes the app after tapping button 40, Service Center may send the user an email or a short message containing similar information.

As a user only needs to tap button 40 after the app is launched, hailing a vehicle may become simple, quick, and convenient. Such a one-tap-to-hail-a-car process especially fits autonomous vehicles. For instance, before a taxi with a driver is dispatched, the driver's work area and work schedule have to be reviewed. Some drivers may not be available for a long trip or a trip to a specific area. On the contrary, autonomous vehicles don't have such limiting factors. They may be treated relatively equal. They may be sent to a user without knowing destination info or without worrying about where the user will go.

When a user wants to schedule a pickup at a later time or at another location, the user may tap button 44. After the button is tapped, a window may appear where related information may be submitted.

When a user needs a vehicle, the user may tap button 40 or 44 to hail one. Next, Service Center may dispatch a vehicle to pick up the user. Sometimes when there are available vehicles nearby, a user may want to take a look at the vehicles, compare them, and then choose one to hail it. Button 42 is arranged for checking vehicles within a given short distance. When the app senses button 42 is tapped, it sends a message to Service Center. The message contains the user's location info and a request for finding vehicles. The user's account number may or may not be included, depending on the setting or user selection. Next, Service Center receives the message and retrieves vehicle info from database. The center may conduct a search and select vehicles which are parked around the user within a given distance. The given distance may be determined by Service Center and arranged around, for instance, one hundred to two hundred meters. Service Center then sends info about the selected vehicles to the user. The info contains locations of selected vehicles and a map covering areas around the user.

Figure 5:
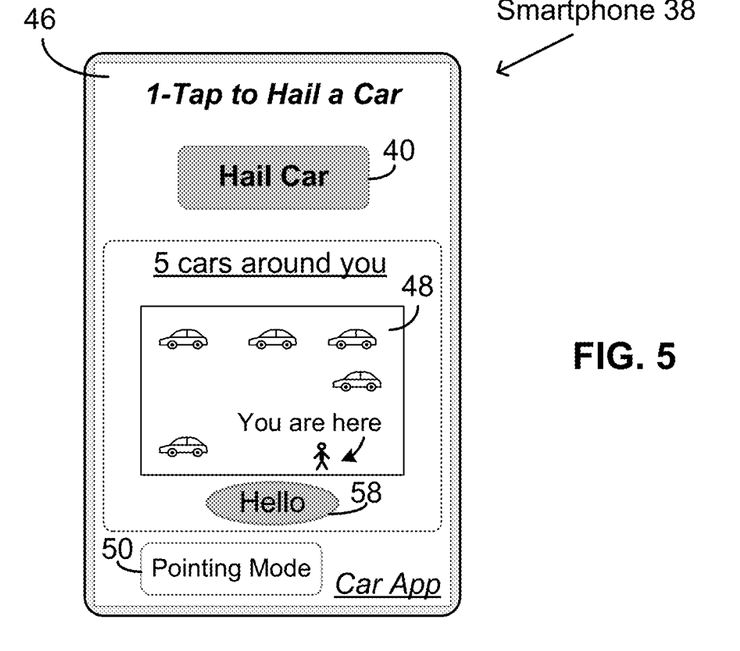

After getting the info from Service Center, the app presents it in the interface, as depicted schematically in FIG. 5. A message "5 cars around you" summarizes the search result. The map is presented in a window 48. There are five vehicle icons representing five vehicles on the map. A user may take a look at the map and then search around to find the vehicles in the surroundings. The five vehicles may be notified by Service Center already and each may show a vacant sign. A button 58 with a label "Hello" is configured beneath the map area. Once button 58 is activated, the app sends a "Hello" message to Service Center. The center then sends messages to vehicles which are shown on the map. After receiving the messages, the vehicles may respond by showing a "Hello" signal or sign. The "Hello" signal or sign may be arranged more conspicuous than the vacant sign. It shows that a vehicle is available and ready for hailing. Examples of the "Hello" signal or sign may include flashes of certain light and a word like "Hello", "Available", or "Ready", etc. The "Hello" signal or sign may last for a short period of time, such as around one to three minutes. A user may tap button 58 to have a better survey on nearby vehicles. When the user finds a suitable vehicle, the user may hail it with a gesture or via the app.

Alternatively, a small check box may be configured beside each vehicle icon on the map of window 48. A user may check one or more boxes and then tap "Hello" button 58. Then only the checked vehicles, i.e., the vehicles whose boxes are checked, are notified by Service Center. These vehicles may respond by showing the "Hello" signal or sign. Thus, a user may use the check boxes and the "Hello" button to recognize each vehicle individually. For instance, a user may check a box, tap the "Hello" button, and then look around to see which vehicle shows the "Hello" signal or sign. The check box helps a user find and interact with a vehicle conveniently.

The vehicle icons which represent vehicles on the map are arranged interactive. A user may tap a vehicle icon to find info about a vehicle. For instance, a window may show up after a vehicle icon is tapped. The window may provide vehicle info like make, model, year, color, and so on. The window may also present an interactive button "Hail this car". When a user taps "Hail this car" button, the app sends a message to Service Center. The message may state that the user has selected the vehicle and wants to hail it. Next, Service Center may approve the request and assign the vehicle to the user. The center may send a message to the user to confirm the hailing result and send another message to notify the vehicle.

Since button 40 remains valid in the app interface, a user may tap it anytime to do a quick hailing process. It is noted that tapping button 40 means a user asks Service Center to choose a vehicle. Service Center may select a vehicle around the user or from another place.

Although positions of available vehicles are displayed on a map, such as the map in window 48, some users may still find it hard to know where the vehicles are in the real world. The problem is that a traditional map shows locations in all directions and it is not intuitive to match a place on a map to a place in front of a user. In order to overcome difficulties to figure out a vehicle's real location, a button 50 is arranged. The button, having a label "Pointing Mode", is used to present an elongated map in the interface.

Figure 6:
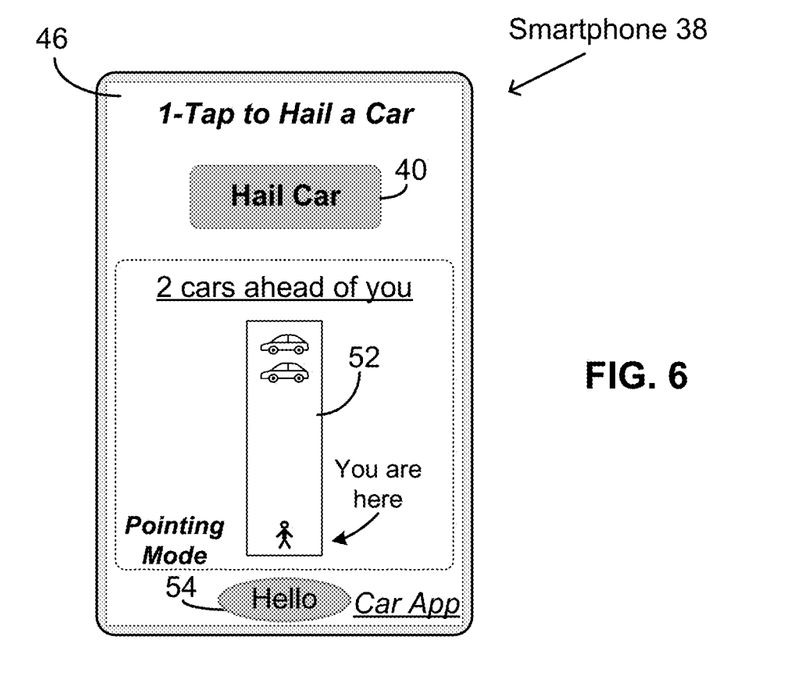
FIGS. 6 and 7 are exemplary diagrams which illustrate interface settings for finding vehicles in pointing mode in accordance with the present invention.

After sensing button 50 is tapped, the app removes window 48 and replaces it with a window 52, as illustrated schematically in FIG. 6. Window 52 shows an elongated map. A message "2 cars ahead of you" tells a user that there are two vehicles in a forward direction. Another message "Point Mode" is used to remind a user that the map is in pointing mode. "Pointing mode" as used herein means a map has an elongated shape and is elongated along the phone's pointing direction. When a screen of a smartphone or smart watch is in a horizontal plane, the pointing direction is what its front end faces at. When the screen is in a vertical plane, the pointing direction is what the screen's back faces at. As the map in window 52 is narrow, it may be arranged to display available vehicles only in front of a user or only in a forward direction and still within a short given distance. When there are two vehicle icons on the map, it means there are two vehicles in the pointing direction of phone 38. Hence confusion about which direction a vehicle is located in may be overcome, since the direction is what the phone points at. It is noted that the pointing mode needs orientation data of a device. Thus orientation capability should be enabled at a device to support the pointing mode.

Similar to button 58, a "Hello" button 54 is configured on screen 46 of FIG. 6. A user may tap button 54 to send a "Hello" message to Service Center. The center then sends messages to the two vehicles and lets them show the "Hello" signal or sign.

Figure 7:
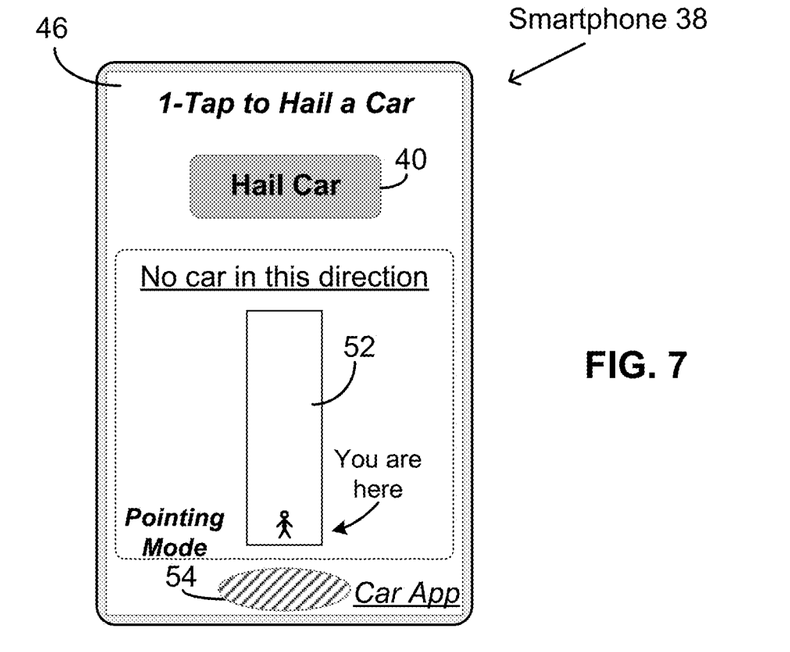

In addition, the user may also points phone 38 at different directions to check vehicle availability elsewhere. FIG. 7 depicts a scenario when there is no available vehicle along a pointing direction. Correspondingly, there is no vehicle icon on the elongated map in window 52. In such a case, button 54 may be configured to appear blank with a decreased brightness level.

Returning to FIG. 4. When a user wants to find vehicles around him or her, the user may tap button 42. After that, the app sends a search request to Service Center. The request also contains location data of the user. The center then searches available vehicles nearby. Next, the center sends to the user location info of selected vehicles and a map which covers a given short distance from the user. In the meantime, the center sends wake-up messages to the selected vehicles which appear on the map.

Figure 8:
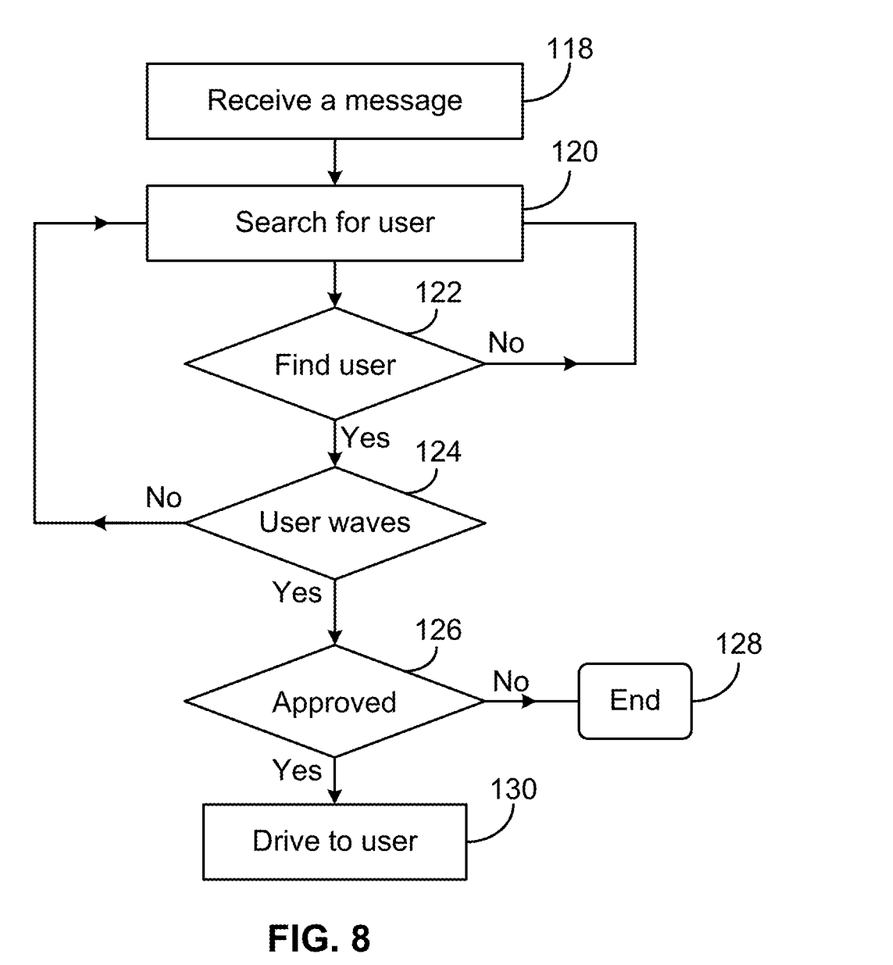
FIGS. 8 and 9 are exemplary flow diagrams depicting hailing processes in accordance with the present invention.

Once a vehicle receives a wake-up message from Service Center, it starts a hailing process. FIG. 8 shows an exemplary flow diagram for such an event. At step 118, a vehicle receives a wake-up message from Service Center. Next, the vehicle begins searching for a user who may want to hail a vehicle at step 120. The vehicle may already have a vacant sign to show it's available. If not, it displays the sign to notify people around it. As Service Center has location data of the user, it passes the info to the vehicle so that the vehicle knows where the user might be. Resultantly, the vehicle may ignore users from other areas. Thus interference, misunderstanding, and misrepresentation may be reduced.

Sometimes the vehicle may not find the user immediately, as the user may be blocked by an object, e.g., a building or another vehicle. If a search has no result at step 122, step 120 is taken again and the search continues. When the vehicle finds the user at step 122, it ascertains whether the user waves at it at step 124. If the user doesn't wave at the vehicle within a given time period, it may mean the user may not be the person who wants to hail a vehicle. Then the vehicle returns to step 120 and starts another search. If it is detected that the user waves at the vehicle at step 124, the vehicle sends a hailing message to Service Center and asks for approval at step 126. Once receiving an approval message, the vehicle calculates a route and drives to the user at step 130. If it is not approved, the process ends at step 128. As aforementioned, Service Center may use the approval process to verify that the vehicle is not reserved for another task. The approval process is also useful when multiple vehicles each determine a user is waving at it. As a user may gesture from a distance, it may be difficult to tell which vehicle the user aims at. Then Service Center may receive hailing requests from several vehicles within a given time frame, say one to five seconds. The center may select a vehicle based on certain rules. For instance, the center may pick a vehicle which is the closest to the user and assign it to take the task. Alternatively, the center may select a vehicle which is the first to submit a hailing request.

In addition, the vehicle may ascertain whether the user walks toward it at step 124. If the user waves or raises hand and then walks to the vehicle, the vehicle may stay there waiting for the user to come.

Figure 9:
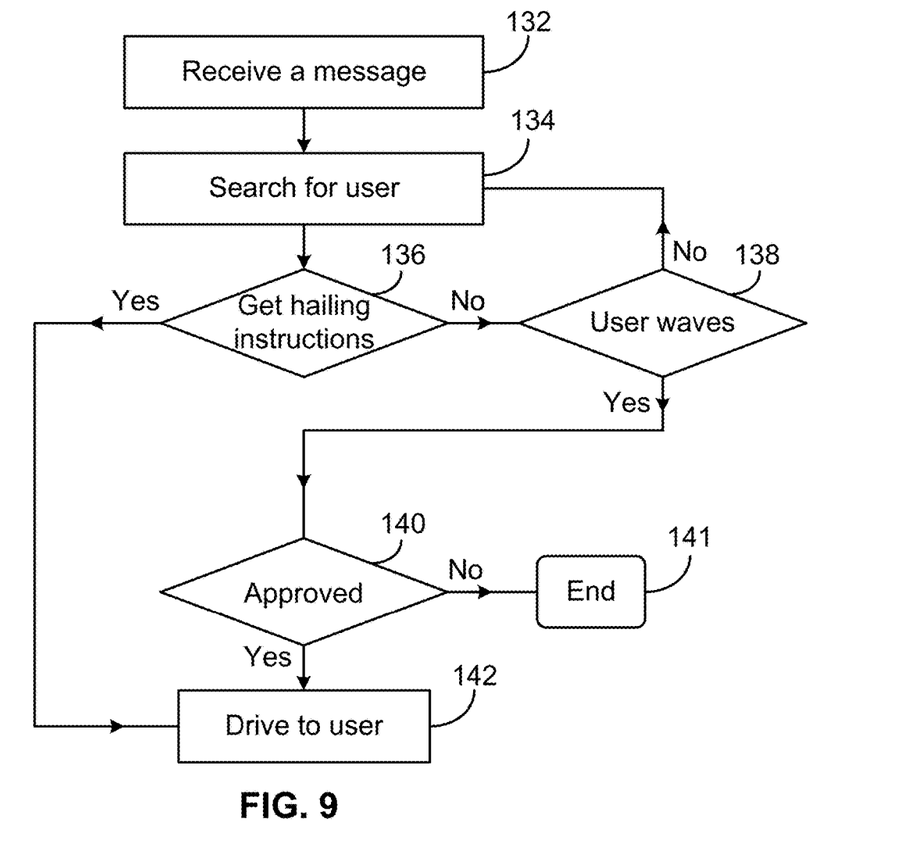

FIG. 9 shows another exemplary flow diagram of a hailing process. A vehicle receives a wake-up message from Service Center at step 132. As aforementioned, after a user launches an app at a user device and requests a vehicle search at Service Center, the center sends wake-up messages to selected vehicles which are within a given short distance from the user. One of the selected vehicles starts a process to find the user at step 134. The vehicle may already have a vacant sign to show it's available. If not, it displays the sign to notify the public. Meanwhile, Service Center also sends relevant vehicle info to the user. An app interface like that of FIG. 5 may show up at the user device. Vehicle icons representing available vehicles within the short distance are displayed.

At step 136, the vehicle monitors messages from Service Center. One of the messages may contain hailing instructions. For instance, a user may tap a vehicle icon in the interface, like the icons in window 48 or 52 of FIG. 5 or 6. After the app detects that a vehicle icon is tapped, it presents a new window. The window may show info of the vehicle and a "Hail this car" button. Then the user taps the "Hail this car" button to reserve the vehicle. In response to activation of the button, the app contacts Service Center and passes the info. Service Center then assigns the vehicle to the user and sends hailing instructions to the vehicle. After the vehicle receives the hailing instructions, it drives to the user autonomously at step 142 and picks up the user.

If the vehicle doesn't receive any hailing instructions at step 136, it searches for the user or detects whether any hailing gestures are made when the user is found at step 138. If the user is not found or hailing gestures are not observed for a given period of time, the vehicle returns to step 134 to start another round. If hailing gestures are detected at step 138, the vehicle sends a hailing message to Service Center. At step 140, if the vehicle gets a disapproval message from the center, the hailing process ends at step 141. If the vehicle receives approval from the center, it drives to the user autonomously at step 142 and picks up the user.

Figure 10:
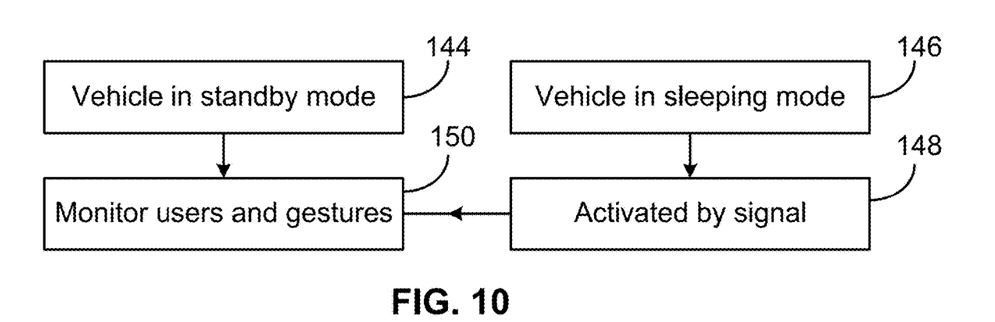
FIG. 10 is an exemplary flow diagram depicting vehicle activities in accordance with the present invention.

FIG. 10 shows an exemplary flow diagram which depicts vehicle activities according to the present invention. When a vehicle is free of any assignment and sits beside the curb of a road or at a parking lot, it may have two modes. At step 144, a vehicle is in standby mode with a vacant sign displayed. The vehicle's engine or motor is turned off, while the sensors which monitor the external environment are still on. The vehicle is arranged to monitor nearby users, ascertain them, and detect their gestures at step 150. If a user waves at the vehicle, a control system of the vehicle may analyze it, determine the meaning of it, and drives to the user autonomously with or without approval from Service Center.

Alternatively, a vehicle may also rest in sleeping mode as shown at step 146. When a vehicle is in sleeping mode, not only the engine or motor is off, but also most sensors are off. The vehicle may display a sign with words like "Out of service". The vehicle doesn't monitor its surroundings or detect a user's gestures. The sleeping mode may be interrupted by a signal from Service Center at step 148. After the vehicle receives a wake-up signal or wake-up message from Service Center, it turns on the sensors and displays a vacant sign. The vehicle then starts monitoring users in the surroundings at step 150. Hence, a user may gesture to hail a vehicle in standby mode, but may not do it if the vehicle is in sleeping mode. A vehicle in sleeping mode may be activated by Service Center, which may happen after the center receives a search request from a user.

Figure 11:
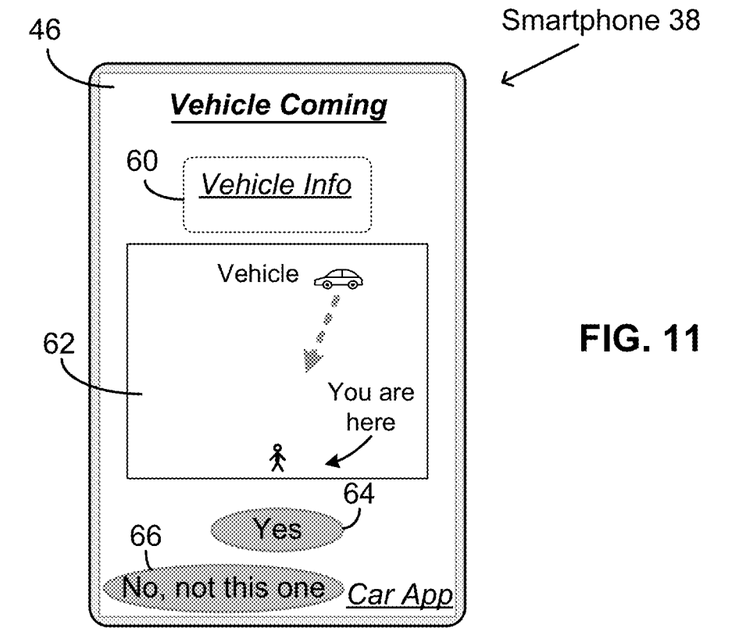
FIGS. 11 and 12 are exemplary diagrams showing hailing processes in accordance with the present invention.

FIG. 11 shows an exemplary app interface which reflects a scenario after a user hails a vehicle according to the present invention. The vehicle may be hailed via a gesture or tapping a button as aforementioned. A title "Vehicle Coming" is displayed on the top portion of the screen, which assures the user that the vehicle is coming to pick up him or her. A window 60 may show the make, model, year, color of the vehicle and other info. A map in a window 62 may show the real-time position of the vehicle and the user. Location info of the vehicle may come from Service Center, which gets it from the vehicle. The user may tap a "Yes" button 64 to verify the hailing result. If the user doesn't tap button 64, it would not matter. If the user finds a wrong vehicle is selected, the user may tap a "No, not this one" button 66 to cancel the selection. After button 66 is tapped, the app may notify Service Center and present other available vehicles on the map. Then the user may tap an icon of another vehicle to select it. The user may also gestures at another vehicle to hail it, as discussed in the above. The newly selected vehicle may appear moving on the map as it approaches the user.

Figure 12:
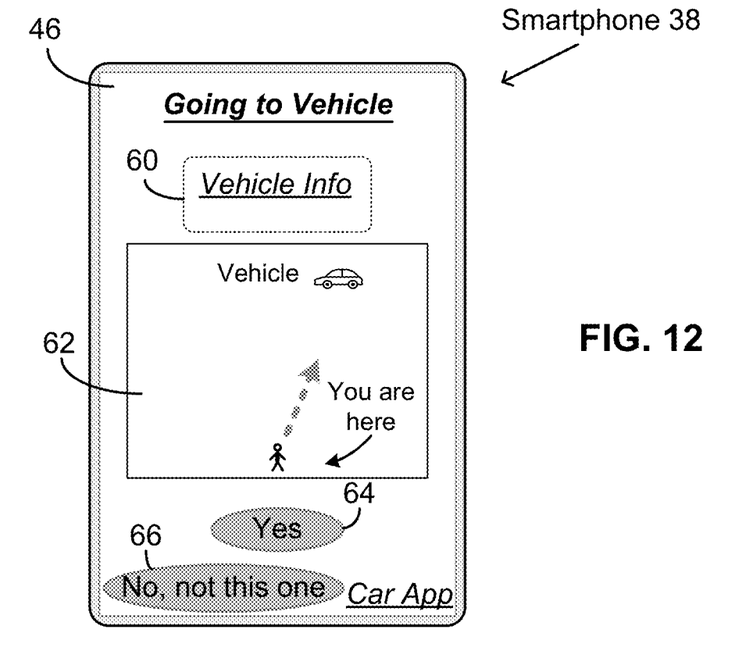

If the user walks to the vehicle after hailing it, the vehicle may detect the action and report it to Service Center. Service Center then sends a message to the app. The app in turn presents another interface, which is depicted exemplarily in FIG. 12. The title of the interface says "Going to Vehicle", confirming that the user is going to the vehicle. Overall, FIG. 12 resembles FIG. 11. Information about the vehicle is presented in window 60. The map in window 62 may show that the user moves toward the vehicle in real time, while the vehicle stays put. Similarly, buttons 64 and 66 are arranged for the user to verify the hailing act or cancel it.

Figure 13:
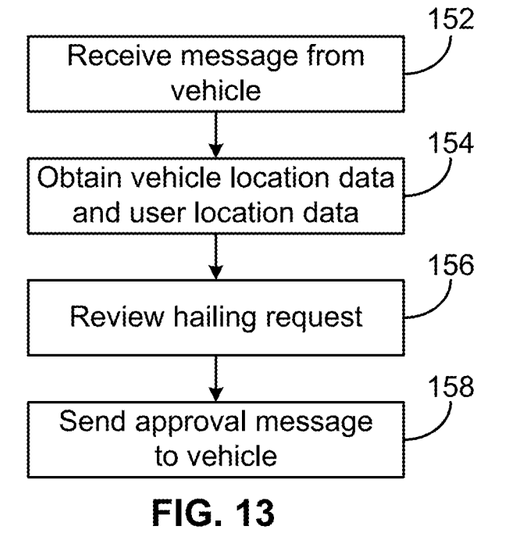
FIGS. 13 and 14 are exemplary flow diagrams describing hailing processes in accordance with the present invention.

After detecting a user's hailing gestures, a vehicle may drive to the user directly or wait for approval from Service Center before approaching the user. Both methods have merits. The former is easy to implement, while the latter may improve user experience as it prevents confusion and awkwardness caused by multiple vehicles going to the same user. FIG. 13 shows an exemplary flow diagram which describes a hailing process supervised by Service Center. At step 152, Service Center receives a hailing message from a vehicle. The message is sent after the vehicle detects that a user makes a hailing gesture at it. The center checks contents of the message. At step 154, the center obtains from the message location data of the vehicle, location data of the user, and info about the gestures which are considered as a hailing request. Location data of the user is acquired by the vehicle via measurements using sensors. The center may also obtain from the message images of the user which are taken by the vehicle.

At step 156, Service Center reviews the hailing case. Based on location info of the user, or the location info plus images of the user, the center checks how many vehicles send a hailing message about the same user. When a user is at a distance while some vehicles are relatively close to each other, the vehicles may receive the same gesture signals from the user. Thus more than one vehicle may receive the same hailing request. When Service Center receives a hailing message from only one vehicle within a given time period, the vehicle is selected. When Service Center receives hailing messages from multiple vehicles within the given time period, the center may select one based on predetermined rules. For instance, the center may calculate a distance between a vehicle and the user based on the location info. A vehicle which is the closest to the user may be selected. Alternatively, the center may also select a vehicle which is the first to send a hailing message. In addition, the center may check whether a vehicle is reserved already and remove the vehicle if it is assigned to another task. At step 158, a vehicle is chosen and assigned to the user after the reviewing process. The center then sends an approval message to the vehicle. The method applies to vehicles sitting at a place or running on a road. When the vehicles are parked, the given time period may be one to five seconds. When the vehicles are running, the given time period may be one to two seconds or shorter.

Figure 14:
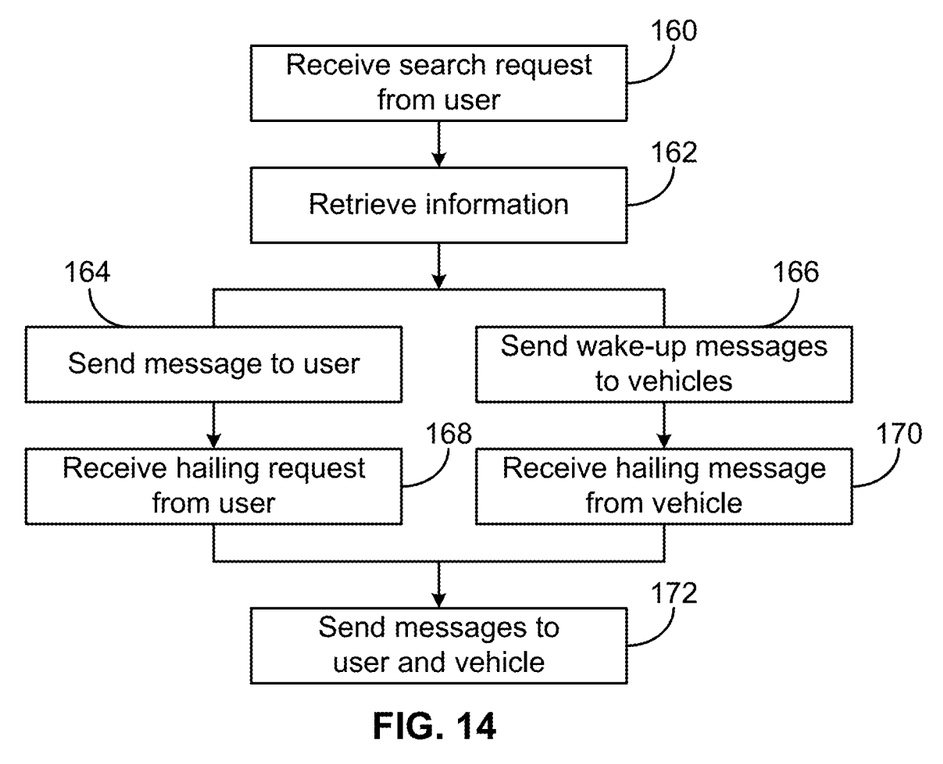

FIG. 14 shows another exemplary flow diagram about a hailing process supervised by Service Center. At step 160, Service Center receives a vehicle search request from a user. The request is sent after the user launches an app at a user device and submits a search request, like tapping button 42 of FIG. 4. As aforementioned, location data of the user is also sent to the center with the search request. At step 162, the center finds suitable vehicles around the user within a given short distance and retrieves info of the selected vehicles from database. At step 164, the center sends the vehicle info to the user. Once the user device obtains the vehicle info, it presents a map in the app interface, where locations of the selected vehicles are displayed. At step 168, Service Center receives a hailing request for a vehicle from the user. As discussed, the user may tap a vehicle icon on the map and proceed to hail the vehicle. The center may review the request, approve it, and send messages to the user and the chosen vehicle respectively at step 172. The message to the user confirms the hailing act. The message to the vehicle contains location data of the user and instructions for the vehicle to find and engage the user.

After receiving a search request from the user, Service Center also sends messages or wake-up messages to the selected vehicles at step 166. When a vehicle is in standby mode, the message serves as a notification. When a vehicle is in sleeping mode, the message works as a trigger or an activation command besides a notification. As discussed, the selected vehicles may search for the user and display vacant signs to show they are available. Once a vehicle detects that the user gestures at it, it sends a hailing message to Service Center. The center may receive the hailing message from one or more vehicles at step 170. The center then reviews the hailing case, chooses a vehicle based on certain selection rules when multiple vehicles are involved, and assigns the vehicle to the user. As aforementioned, the center may select a vehicle based on vehicle-user distance or message-sending time. At step 172, Service Center sends a confirmation message to the user and instructions to the assigned vehicle to conclude the hailing application process.

CONCLUSION, RAMIFICATIONS, AND SCOPE

Thus it can be seen that systems and methods are introduced for hailing a vehicle.

The systems and methods have the following main features and advantages:
(1) A user may hail a vehicle by gestures when seeing it;
(2) A user may hail a nearby vehicle via an app or via an app plus gestures;
(3) A user may search vehicles within a short distance using an app;
(4) A vehicle may monitor a user and detect hailing gestures;
(5) A vehicle may navigate to a user autonomously after the user hails it; and
(6) A vehicle may stay at a place waiting for a user after the user hails it and then walks toward it.

Although the description above contains many specificities, these should not be construed as limiting the scope of the invention but as merely providing illustrations of some of the presently preferred embodiments. Numerous modifications will be obvious to those skilled in the art.

RAMIFICATIONS

A vehicle may detect and recognize a gesture through certain algorithm and convert the gesture into instructions. Besides waving a hand, raising a hand, and using a finger to point at a vehicle, other hand signs, such as a "Come here" hand signal, may also be used as hailing gestures. While gesturing, a user has to face the vehicle; otherwise, the gestures are ignored. When a user is close to a vehicle, the user may also nod to contact, select, or hail a vehicle. Nodding may be especially useful for contacting or hailing a robot, as a user may meet a robot at a close distance. In addition, gazing may be combined with nodding to reduce miscommunication. For instance, a vehicle may start gaze sensing procedures when it detects a user nods at it. Gaze sensing may be turned off when nodding is not detected or certain conditions are not satisfied, as users prefer less surveillance. Optionally it may be configured that only when nodding and gazing acts happen at the same time, the nodding act is recognized. Service Center may decide to use nodding alone or nodding plus gazing as a command. As aforementioned, vehicles as used herein include automobiles, robots, drones, flying cars, and ships. Thus hailing gestures apply to all of them.

A facial recognition system of a vehicle may be used to identify a user and match the user with an account in records during a check-in process. Thus a user may submit a picture to Service Center and then check in a vehicle without using code, fingerprint, credit card, or cash. A facial recognition system may also be used to estimate the age of an unregistered user. For instance, a child may not be allowed to hail a vehicle. When a vehicle detects that a person gestures at it, it operates a facial recognition system to ascertain whether the person is a child. If the person is a child, the vehicle stops the hailing activity. It may protect children and prevent pranks. Rules about how to determine a person is a child may be defined by Service Center. In addition, images of a user may also be used to estimate the age. For instance, a user's height, contour, and cloths may be analyzed for age estimation.

In above discussions, a user taps a button to enter an input and interact with a user device. Alternatively, the user may also speak to the device. The device may use a voice recognition system to take and interpret voice commands. For instance, a user may say "Yes" or "No" to phone 38 of FIGS. 11 and 12, which may be arranged to have the same effect as tapping button 64 or 66. A user may also say one or a few words which have the meaning of yes or no, like "Good", "Okay", "Come here", "I'm waiting", "No, wrong car", etc.

When a control system of a vehicle has a voice recognition mechanism, a user may also speak to the vehicle when his or her voice is audible to it. For instance, a user may say certain key words like "Taxi", "You", or "I need a vehicle" to select or hail a vehicle. As a vehicle may have gaze detection capability, a gazing requirement may apply. For instance, a user may have to look at a vehicle when issuing a verbal command. If a vehicle detects that a user doesn't look at it while saying something, the user's verbal input may be ignored. Alternatively, a gazing requirement may be replaced by a facing requirement, i.e., a user may also face a vehicle while speaking to it. Service Center may decide whether to implement the gazing or face requirement. A user may say words or a phrase like "Taxi", "I Need a vehicle", or "Come here" to hail a vehicle with or without making hailing gestures. A vehicle may keep monitoring the surroundings and especially people around it. After receiving a user's voice request, the vehicle sends a message to Service Center for approval. Once getting an approval message from the center, the vehicle calculates a route and approaches the user autonomously.

A user may also use an AR device to hail a vehicle. For instance, a user may open an app and then say "Show cars around me". After the AR device sends a request to Service Center and receives vehicle info from the center, it displays a map to show available vehicles nearby. If the user says "Pointing mode", the app replaces a regular map by an elongated map. For AR devices, the pointing direction is the direction which a user faces at. Thus when a user looks ahead, an AR device may show an elongated map on a virtual display. The map shows an area which is in front of the user.

Sometimes a user may change mind after hailing a vehicle and the vehicle is on the way to approach him or her. Regardless that the vehicle has arrived or not, the user may cancel the hailing event. For instance, the user may tap button 66 of FIG. 11 to cancel it as discussed. A user may also wave at a direction away from a coming vehicle. A vehicle may monitor a hailing user continuously. Once the vehicle detects that the user waves at another object for a given period of time, it may determine that the user cancels the reservation. If the vehicle detects that the user waves at another object briefly and then waves at it again, it may consider the user still wants to keep the reservation. The vehicle then continues moving toward the user. The same strategy applies to a user walking to a vehicle. For instance, a user may stop walking to a target vehicle and wave at a direction away from the vehicle for a certain time period. After the vehicle detects the waving act, it may treat it as a signal to cancel the reservation.

Lastly, a vehicle may be arranged to handle a hailing process with less or no instructions from Service Center depending on prearrangements. For instance, after a vehicle detects that a user is waving at it, the vehicle may calculate a route and set forth a short journey to drive to the user. During the hailing steps, Service Center is not involved. The method may be favored by small ride-hailing companies. In other cases, a vehicle may maintain contact with Service Center and communicate to the center constantly. However, the vehicle may not need approval from the center during a hailing process. Service Center may work as an info source and play a messenger role between the vehicle and a user.

Therefore the scope of the invention should be determined by the appended claims and their legal equivalents, rather than by the examples given.

The invention claimed is:

1. A method for a vehicle or device for a hailing process, comprising:
   1) presenting a sign, wherein the sign shows that the vehicle or device is vacant or ready for hailing;
   2) ascertaining a user using one or more sensors, analyzing an act or gesture of the user, and determining whether the user waves or gestures and whether the user faces the vehicle or device;
   3) transmitting a hailing message to a service facility after determining that the user waves or gestures and the user faces the vehicle or device, waiting for an approval message from the service facility after ascertaining the user and transmitting the hailing message;
   4) receiving from the service facility the approval message for the vehicle or device to pick up the user, wherein the vehicle or device receives the approval message after the vehicle or device transmits the hailing message to the service facility; and
   5) in response to receiving the approval message from the service facility, calculating a route and navigating the vehicle or device to the user along the route after it is detected that the user does not move toward the vehicle or device within a predetermined time period or waiting for the user after it is detected that the user moves toward the vehicle or device.

2. The method according to claim 1, further including searching for the user using information received from the service facility before ascertaining the user.

3. The method according to claim 1, further including presenting a response message to the user after it is detected that the user does not move toward the vehicle or device within the predetermined time period or the user moves toward the vehicle or device.

4. The method according to claim 1, further including stopping navigating the vehicle or device to the user after detecting that the user waves or gestures at a direction not toward the vehicle or device.

5. The method according to claim 1 wherein the gesture includes a waving, pointing, or nodding act.

6. The method according to claim 1 wherein the sign is presented after receiving information that the user wants to hail a vehicle or device from the service facility.

7. The method according to claim 1, further including turning on the one or more sensors for ascertaining the user after receiving a signal from the service facility.

8. A method for a vehicle or device to respond to a hailing request, comprising:
   1) displaying a sign, wherein the sign shows that the vehicle or device is vacant or ready for hailing;
   2) searching for a user who faces the vehicle or device and waves or gestures using one or more sensors after receiving information about the hailing request from a service facility;
   3) transmitting a hailing message to the service facility after finding the user who faces the vehicle or device and waves or gestures, waiting for an approval message from the service facility after searching for the user and transmitting the hailing message;
   4) receiving from the service facility the approval message for the vehicle or device to pick up the user, wherein the vehicle or device receives the approval message after the vehicle or device transmits the hailing message to the service facility; and
   5) calculating a route and navigating the vehicle or device to the user along the route after receiving the approval message from the service facility.

9. The method according to claim 8, further including searching for the user around a location provided in the information about the hailing request received from the service facility.

10. The method according to claim 8, further including waiting for the user when it is detected that the user moves toward the vehicle or device after receiving the approval message from the service facility.

11. The method according to claim 8, further including stopping navigating the vehicle or device to the user after detecting that the user waves or gestures at a direction not toward the vehicle or device.

12. The method according to claim 8 wherein a gesture which the user makes includes a waving, pointing, or nodding act.

13. The method according to claim 8, further including presenting a response message to the user in response to an action of the user.

14. The method according to claim 8, further including turning on the one or more sensors for searching for the user after receiving the information about the hailing request.

15. A vehicle or device capable of moving around, comprising:
a plurality of sensors; and
a control system including a processor and a memory or memory unit, the control system operable to:
1) present a sign, wherein the sign shows that the vehicle or device is vacant or ready for hailing;
2) ascertain a user using at least one of the plurality of sensors, analyze an act or gesture of the user, and determine whether the user waves or gestures and whether the user faces the vehicle or device;
3) transmit a hailing message to a service facility after determine that the user waves or gestures and the user faces the vehicle or device, wait for an approval message from the service facility after ascertaining the user and transmitting the hailing message;
4) receive from the service facility the approval message for the vehicle or device to pick up the user, wherein the vehicle or device receives the approval message after the vehicle or device transmits the hailing message to the service facility; and
5) in response to receiving the approval message from the service facility, calculate a route and navigate the vehicle or device to the user along the route after it is detected that the user does not move toward the vehicle or device within a predetermined time period or wait for the user after it is detected that the user moves toward the vehicle or device.

16. The vehicle or device according to claim 15 wherein the control system is arranged to search for the user after receiving information from the service facility.

17. The vehicle or device according to claim 15 wherein a response message is presented to the user in response to an action of the user.

18. The vehicle or device according to claim 15 wherein the control system stops navigating the vehicle or device to the user after detecting that the user waves or gestures at a direction not toward the vehicle or device.

19. The vehicle or device according to claim 15 wherein the gesture includes a waving, pointing, or nodding act.

20. The vehicle or device according to claim 15 wherein the control system is arranged to turn on the at least one of the plurality of sensors for ascertaining the user after receiving a signal from the service facility.

* * * * *